No. 12,282. REISSUED NOV. 1, 1904.
W. P. BETTENDORF.
SILL FOR THE UNDERFRAMES OF CARS.
APPLICATION FILED AUG. 12, 1904.
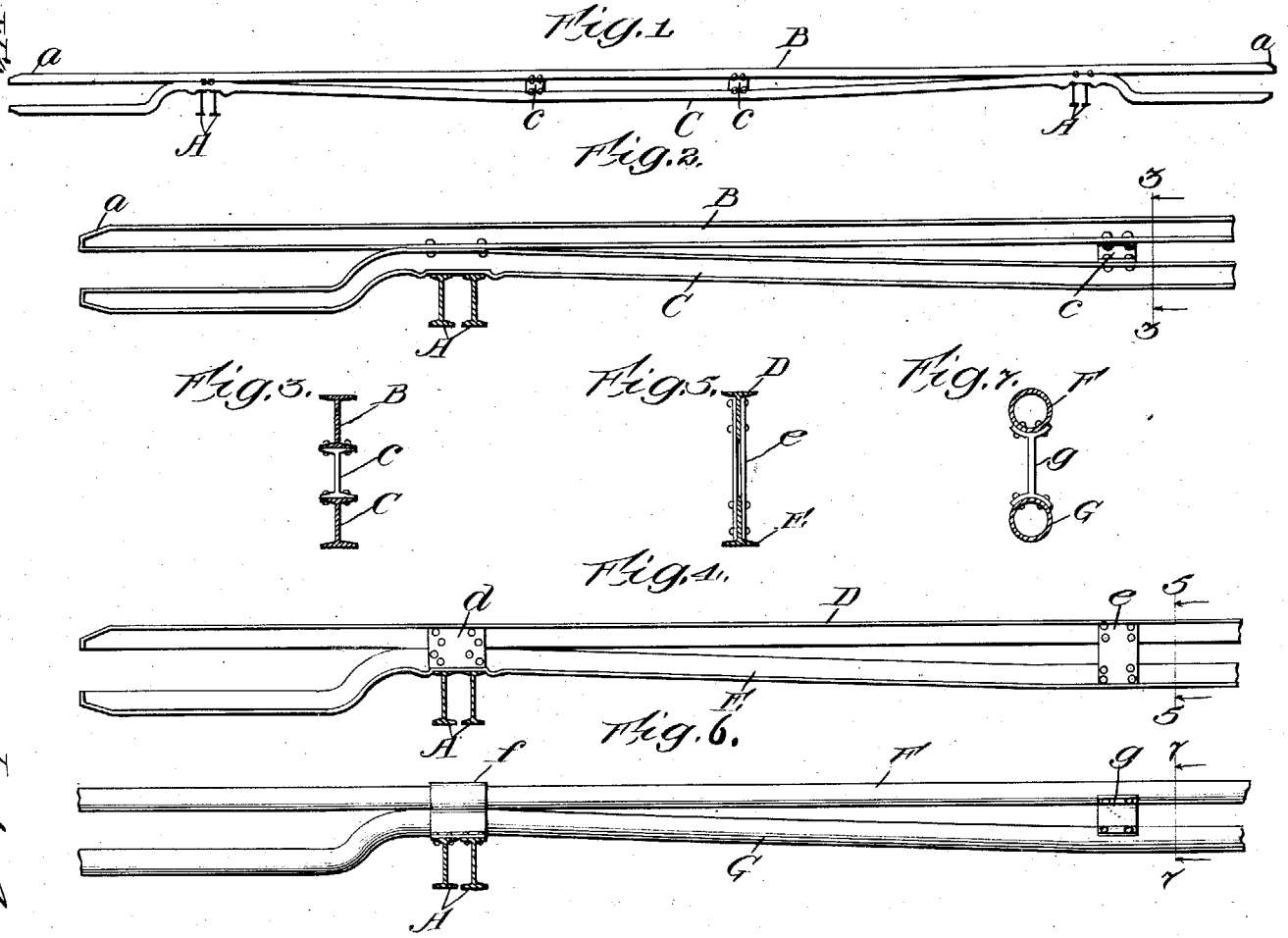
Witnesses:
O. M. Kennick
E. K. Lundy
Inventor
William P. Bettendorf.
by
Frank D. Thomason
Attorney No. 12,282. Reissued November 1, 1904.

UNITED STATES PATENT OFFICE.

WILLIAM P. BETTENDORF, OF DAVENPORT, IOWA.

SILL FOR THE UNDERFRAMES OF CARS.

SPECIFICATION forming part of Reissued Letters Patent No. 12,282, dated November 1, 1904.

Original No. 657,154, dated September 4, 1900. Application for reissue filed August 12, 1904. Serial No. 220,578.

*To all whom it may concern:*

Be it known that I, WILLIAM P. BETTENDORF, of Davenport, in the county of Scott and State of Iowa, have invented certain new and useful Improvements in Sills for the Underframes of Cars, of which the following is a full, clear, and exact specification.

My invention relates to the longitudinal sills of cars, including those generally known as the "center" and "side" sills; and the object of said invention is to provide a continuous sill composed of two conterminous lengths of beams or their equivalents, the relative construction and arrangement of which are such that the height of the sill is reduced in the vicinity of the body-bolsters, so as to pass over and rest upon the same, and separated between the bolsters, so as to form a truss, and also separated when it is desired to utilize them as center sills between said bolsters and the ends of the car, so as to furnish a suitable support for the draft-rigging. This I accomplish by the means hereinafter fully described and as fully set forth in the claims.

In the drawings, Figure 1 is a side view of the center sill of the underframe of a car constructed according to the arrangement of my invention. Fig. 2 is a similar view of one half length of the same, drawn to a larger scale. Fig. 3 is a transverse section therethrough, taken on dotted line 3 3, Fig. 2. Fig. 4 is a side view of one half length of a modified construction of said center sill. Fig. 5 is a transverse section of the same, taken on dotted line 5 5, Fig. 4. Fig. 6 is a side view of one half length of yet another modified construction of my invention; and Fig. 7 is a transverse section therethrough, taken on dotted line 7 7, Fig. 6.

In the drawings, A represents the body-bolsters of a car, and B represents the upper and C the lower member of the center sill of the same. The upper member B consists of a straight section of I-beam corresponding in length to that of the underframe of the car and preferably having its ends *a a* slightly reduced and flange-bound in any suitable manner. The lower member C also consists of a section of I-beam, preferably of the same dimensions as that of B and continuous in length from one end of the car to the other. The upper flanges of member C are directly secured to the lower flanges of member B by rivets or otherwise only at the point where the sill passes over the bolsters, and between said bolsters the lower member is bent downward at a suitable angle to a point or central zone midway between the bolsters and is there secured in such separated position by king-posts *c c*, each consisting of a short section of I-beam interposed between said members and secured thereto by bolts or rivets passing through its flanges and through the upper flanges of the one and the lower flanges of the other member of the sill, as shown in the drawings. This construction of the sill between the bolsters of the car gives it a truss shape which is both light and strong and durable. Between the bolsters and the ends of the sill the lower member takes a downward curve a suitable distance immediately after leaving the bolster and there pursues a straight course parallel with the upper member to its end, which terminates in the same plane as those of said upper member. This downward bend of the lower member between the bolster and the ends of the sill is only resorted to when it is desired to make a center sill, and it is separated in the manner described to facilitate the attachment of the draft-rigging of the car, and as the draft-gear of the car differs greatly according to the style of coupling and drawbars (whose name is legion) so that portion of either or both the members of the sill extending from the plane of the bolsters toward the ends may be differently shaped, so as to accommodate themselves to the changed condition of things without departing from the scope of my invention. When it is desired to adapt my invention for side sills for cars, the lower member between the bolster and the end of the sill is parallel with and secured to the upper member by rivets or otherwise, as shown in dotted lines in Figs. 2, 4, and 6 of the drawings.

In Figs. 4 and 5 of the drawings I show a slightly-different construction in which the two members of the sill D and E are made of I-beams so arranged that the plain edges of the main web come in contact in the same manner and at the same point as the members of the sill shown in Fig. 2, to the construction and arrangement of which they correspond. These I-beams are secured together by means of a short plate *d*, riveted or otherwise secured thereto just above the bolster, and by means of king-plates or spacing-plates *e*, suitably located between said bolsters to form a truss.

In Fig. 6 I show another modification in which the members of the sills are made of tubes F and G, the relative shape and arrangement of which correspond to that of the members of the sills shown in Figs. 2 and 4. Over the bolster these two are secured together by a clip *f* and between the bolsters are separated and connected in such separated position to form a truss by a king-post *g*, consisting of a short section of I-beam, the flanges of which are bent to form concave seats conforming to the curvature of the portion of the tube against which they impinge, as shown in Fig. 7.

What I claim as new is—

1. A sill for car-bodies consisting of two continuous members arranged one above the other, extending from end to end of the car and above the car-bolsters, said members being separated between the said bolsters to form a truss, and brought into direct contact and union at points above the car-bolsters, and again separated beyond such bolsters.

2. A sill for underframes of cars consisting of two continuous members arranged one above the other, extending from end to end of the car above the car-bolsters, the upper of said members being straight from end to end, and the lower member being united with said upper member at points above the bolsters, and bent down between said points of union to form a truss, and again bent downward at points beyond said bolsters.

3. A sill for car-bodies consisting of two members arranged one above the other and extending from end to end of the car, said members being centrally separated to form a truss, and united at points intermediate their ends, and having their free ends beyond said points of union separated in a vertical plane, to leave an unobstructed opening therebetween.

In testimony whereof I have hereunto set my hand, at Chicago, Illinois, this 2d day of August, 1904.

WILLIAM P. BETTENDORF.

Witnesses:

ELVA WHITE,

E. K. LUNDY.